July 15, 1958 J. L. PETTUS ET AL 2,843,446

SIGNAL WAVE GENERATOR FOR RECORDING A CONTROL SIGNAL

Filed Aug. 1, 1955

INVENTORS.
James L. Pettus
& Kurt Singer
BY [signature]
ATTORNEY.

United States Patent Office 2,843,446

Patented July 15, 1958

2,843,446

SIGNAL WAVE GENERATOR FOR RECORDING A CONTROL SIGNAL

James L. Pettus, Encino, and Kurt Singer, North Hollywood, Calif., assignors to Radio Corporation of America, a corporation of Delaware Application August 1, 1955, Serial No. 525,556

7 Claims. (Cl. 346—74)

This invention relates to electrical generators, and particularly to the generation of an electrical signal which will provide a signal of uniform amplitude and wavelength at a constant speed of reproduction regardless of the speed of the generator generating the signal.

Many types of electrical current or signal generators are known, the present generator being of the mechanical commutator type for generating a signal to be recorded. The commutator is driven by a motor which is adapted to have its speed varied. To provide a uniform or constant amplitude and wavelength recorded control signal or track on a varying speed magnetic medium under these conditions, the amplitude of the generated signal is determined by a direct current voltage of constant value, while the constant wavelength is obtained by impressing the signal on a recorder which varies the speed of the record medium in synchronism with the generator. Such a signal generator is particularly suitable for use in recording a control track in a memory storage system and in which the sound track is subsequently used to automatically control other apparatus, such as a multiple motion picture film editor, as disclosed and claimed in co-pending application Serial No. 520,193, filed July 6, 1955. In such an editing system, the films are usually advanced at a continuous speed which may be varied to project the pictures at normal motion picture speed or slower to the point of frame by frame. To obtain a proper signal magnitude for reproduction at a constant speed for the purpose of energizing relays or other equipment, it is necessary that the signal be such as to perform its function regardless of the speed of the film on which the signal is recorded.

The principal object of the invention, therefore, is to facilitate the recording of a constant amplitude control signal when the record medium is driven at different speeds.

Another object of the invention is to provide an improved signal generator which produces a constant amplitude and constant wavelength signal record at different speeds of the recording medium.

A further object of the invention is to provide a mechanical commutator type of signal generator which will provide pulses of constant amplitude and a recorded signal of a constant wavelength at different recording speeds of the recording medium.

The novel features which are believed to be characteristic of this invention, both as to the manner of its organization and the mode of its operation, will be better understood from the following description when read in conjunction with the accompanying drawings, in which.

Figure 1:
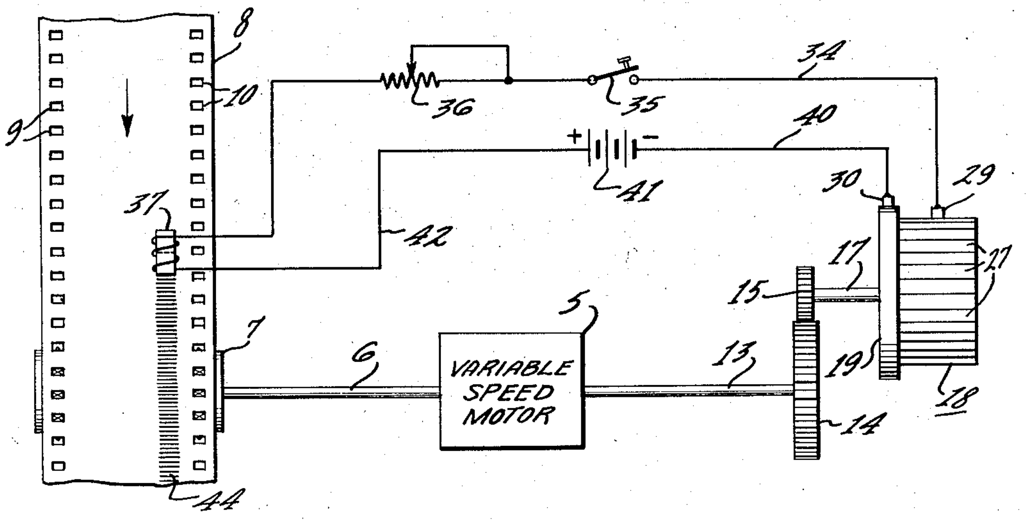
Fig. 1 is a diagrammatic view of a generator and recorder embodying the invention.

Referring now to the drawings, and particularly Fig. 1, a variable speed motor 5 is connected by a shaft 6 to a sprocket 7 driving a magnetic film medium 8, the film having the usual sprocket hole rows 9 and 10. The motor is also connected by a shaft 13 to a gear 14 in mesh with a smaller gear 15. The motor 5 may be adapted to have its speed varied to vary the speed of advancement of the magnetic film 8 and will thus vary the speed of rotation of the gear 15.

Figures 2, 3:
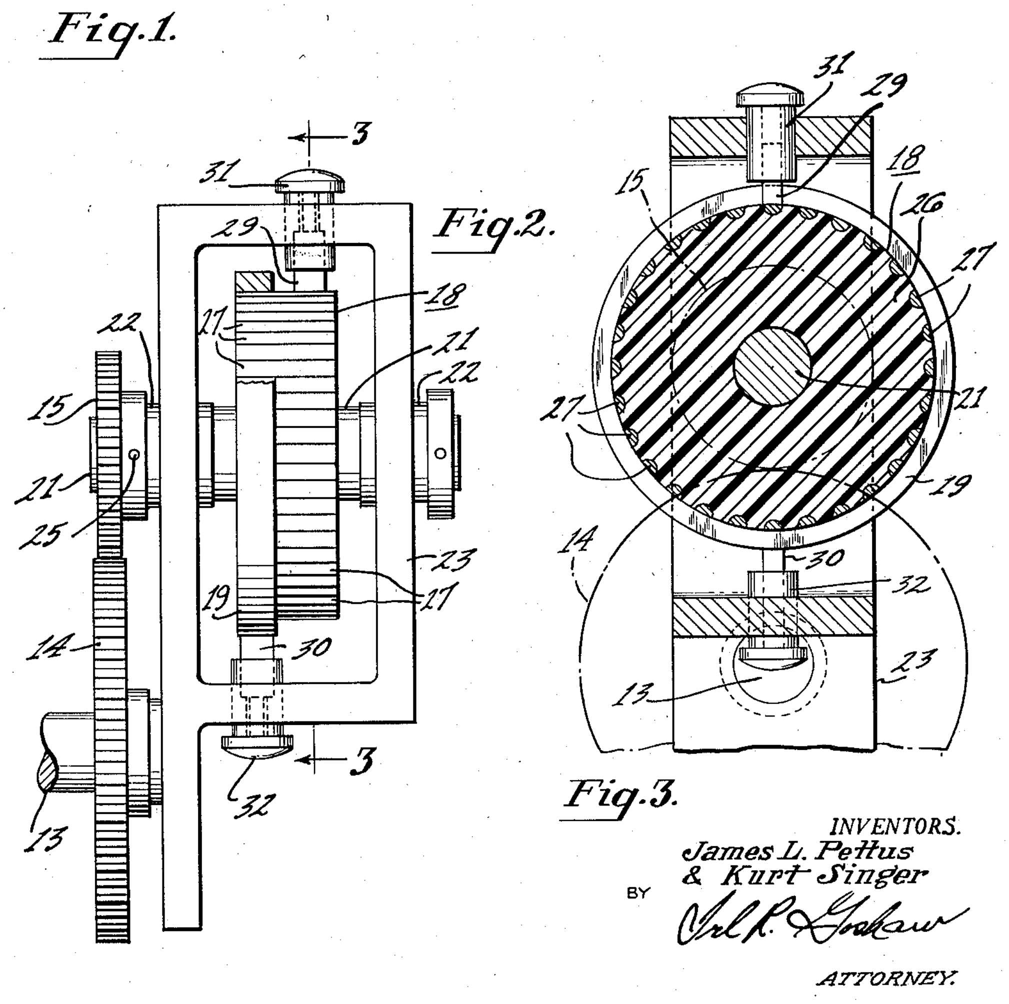
Fig. 2 is an enlarged elevational view of the generator used in the invention.
Fig. 3 is a cross sectional view taken along the line 3—3 of Fig. 2.

The gear 15 is connected by a shaft 17 to a commutator 18 and slip ring 19 combination. As shown in Fig. 2, the commutator 18 and slip ring 19 are mounted on a shaft 21 in bearings 22 in a frame 23. The gear 15 is fixedly mounted on the shaft 21 by a pin 25. Thus, rotation of the gear 15 will rotate the commutator 18 and slip ring 19 at whatever speed it is driven by the motor 5. The commutator base or rotor 26 is a non-electrical conductor, such as Bakelite or other phenolic compound, and inserted along its periphery are parallel electrical conducting segments 27. The ends of the segments are all electrically connected to the slip ring 19.

Mounted diametrically opposite one another on the frame 23 are brushes 29 and 30 in respective brush holders 31 and 32. Brush 29 is adapted to contact the commutator segments and spaces between segments while brush 30 is in contact with the slip ring 19. The distances between the commutator segments 27 and the spaces therebetween may be equal or of different spacing to provide pulses of different lengths which will shape the pulses.

Referring again to Fig. 1 wherein the brush 30 is being shown adjacent the brush 29 for clarity of illustration, brush 29 is connected over conductor 34, a switch 35, a variable resistor 36 to the windings on a magnetic recording head 37. The brush 30 is connected over conductor 40 over battery 41 and conductor 42 with the winding of the head 37. The signal or control track shown at 44 will be composed of striations which will have a constant amplitude because of the uniform or constant value voltage impressed on the head 37 by the battery 41. They will also have the same spacing or frequency on the film 8 because the rate of generation of the pulses will vary in synchronism with the film travel at all times. Thus, regardless of the speed of the film medium 8 on which the control track is recorded, the record 44 will have the same amplitude and frequency, and when reproduced at a constant speed will provide the necessary signal strength to operate any relay or similar equipment connected thereto.

To give an example, if the speed of the motor is 180 R. P. M., there are 32 commutator segments, and the ratio between gears 14 and 15 is 4 to 1, there will be a switching or pulse generation rate of $180 \times 32 \times 4$, or 23,040 pulses per minute, or 384 per second. Now, if the sprocket 7 has 32 teeth, such as those used for standard 35 mm. magnetic film having a 0.187 inch pitch between sprocket holes, the film will travel at a rate of 96 pitches per second. Thus, for one second, 384 pulses will be applied, or 4 pulses for each sprocket hole pitch, and each pulse will have a wavelength of $0.1875 \div 4$ or 0.0469 inch. This same wavelength will be maintained regardless of the variations in speed of the motor. If a constant frequency generator were used to provide the control track, a varying wavelength signal proportional to the speed of the recording medium would be produced which, depending on the speed of the medium, might not be effective when reproduced at a constant speed to provide the desired signal strength. The above described generator does not have this fault.

We claim:

1. A signal recording system for recording a constant amplitude, constant wavelength record on a recording medium adapted to vary in speed in the same direction and employing a source of constant voltage, said system comprising a variable speed motor, means for driving said medium in the same direction at different speeds by said motor, a mechanical commutating device driven by said motor, means for connecting said commutating device with said voltage source, said commutating device interrupting the current from said voltage source in accordance with the speed of said motor and said medium, a recording device, and means for interconnecting said voltage source, said commutator and said recording device for recording said interrupted current as a constant wavelength record on said medium.

2. A system for recording a constant amplitude and constant wavelength record on a medium adapted to vary in speed in the same direction and employing a source of constant voltage, said system comprising a recording device, a commutating device adapted to connect said recording device with said source of constant voltage intermittently to interrupt the current from said constant voltage source in accordance with the speed of said medium, and means for driving said commutating device in synchronism with said recording medium for recording said interrupted current as a constant wavelength record on said medium.

3. A system in accordance with claim 2 in which said commutating device includes a non-magnetic rotor, parallel conducting segments mounted on the periphery of said rotor, a slip ring to which said commutating device segments are electrically connected, and a pair of brushes adapted to contact said segments and said slip ring and to be connected to said source of constant voltage and said recording device.

4. A system for recording a constant amplitude and constant wavelength control record on a record medium adapted to vary in speed and employing a source of constant voltage for impression on said medium, said system comprising means for driving said medium at different speeds in the same direction, a recording device adapted to be connected to said voltage source for recording the current from said source on said medium, a commutating device for interrupting the current impressed on said recording device from said voltage source, and means for driving said commutating device in synchronism with said medium for recording said interrupted current as a constant wavelength record on said medium.

5. A system in accordance with claim 4 in which said recording device is a magnetic head and said record medium is a magnetic film.

6. A system in accordance with claim 5 in which said commutating device is a commutator having conducting segments adapted to be connected to said head and said voltage source.

7. A system in accordance with claim 6 in which said first mentioned means is a film sprocket having the same number of teeth as said commutator has segments.

References Cited in the file of this patent

UNITED STATES PATENTS 2,725,554 Phillips ............... Nov. 29, 1955